United States Patent
Kei et al.

(10) Patent No.: US 12,002,287 B2
(45) Date of Patent: Jun. 4, 2024

(54) COMPUTING DEVICE ATTENTION DETERMINATION

(71) Applicant: Hewlett-Packard Development Company, L.P., Spring, TX (US)

(72) Inventors: King Sui Kei, Spring, TX (US); Alexander Wayne Clark, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 429 days.

(21) Appl. No.: 17/049,193

(22) PCT Filed: Aug. 30, 2018

(86) PCT No.: PCT/US2018/048880
§ 371 (c)(1),
(2) Date: Oct. 20, 2020

(87) PCT Pub. No.: WO2020/046346
PCT Pub. Date: Mar. 5, 2020

(65) Prior Publication Data
US 2021/0240968 A1     Aug. 5, 2021

(51) Int. Cl.
*G06K 9/00* (2022.01)
*G06F 3/01* (2006.01)
(Continued)

(52) U.S. Cl.
CPC ............ *G06V 40/161* (2022.01); *G06F 3/012* (2013.01); *G06F 3/013* (2013.01); *G06N 20/00* (2019.01); *G06V 40/20* (2022.01)

(58) Field of Classification Search
CPC .... G06V 40/161; G06V 40/20; G06V 40/171; G06V 40/174; G06V 40/193; G06F 3/012; G06F 3/013; G06F 3/0304; G06N 20/00

See application file for complete search history.

(56) References Cited

U.S. PATENT DOCUMENTS 6,246,779 B1 * 6/2001 Fukui ........................ G06T 7/74
382/118
6,699,043 B2   3/2004 Ho et al.
(Continued)

FOREIGN PATENT DOCUMENTS

CN     102799893     4/2015
CN     104517102     4/2015
(Continued)

OTHER PUBLICATIONS

Gupta, A., et al., "DAiSEE: Towards User Engagement Recognition in the Wild," Journal of Latex Class Files, vol. 14, No. 8, Aug. 2015, pp. 1-12.
(Continued)

*Primary Examiner* — Dhaval V Patel
(74) *Attorney, Agent, or Firm* — Quarles & Brady LLP

(57) ABSTRACT

In one example in accordance with the present disclosure, an attention analysis system is described. The attention analysis system includes a database. The database includes 1) images indicative that users are paying attention to corresponding computing devices and 2) images indicative that users are not paying attention to corresponding computing devices. The system also includes an analyzer to extract multiple user position characteristics from a stream of images of a user disposed in front of a computing device. A comparer of the system determines, by comparing the stream of images of the user to the images in the database, whether the user is paying attention to the computing device.

20 Claims, 6 Drawing Sheets

(51) Int. Cl.
*G06N 20/00* (2019.01)
*G06V 40/16* (2022.01)
*G06V 40/20* (2022.01)

(56) References Cited

U.S. PATENT DOCUMENTS

| | | | |
|---|---|---|---|
| 9,041,766 B1* | 5/2015 | Gates | H04N 7/15 348/14.08 |
| 9,892,315 B2 | 2/2018 | Voss et al. | |
| 2009/0324020 A1* | 12/2009 | Hasebe | G06V 10/76 382/115 |
| 2011/0279676 A1 | 11/2011 | Terada et al. | |
| 2014/0026156 A1 | 1/2014 | Deephanphongs | |
| 2014/0121002 A1 | 5/2014 | Deshpande et al. | |
| 2014/0210978 A1* | 7/2014 | Gunaratne | A61B 5/18 348/77 |
| 2016/0217321 A1* | 7/2016 | Gottlieb | G06V 40/175 |
| 2016/0328015 A1* | 11/2016 | Ha | G06F 3/013 |
| 2018/0077455 A1 | 3/2018 | Abou Mahmoud et al. | |

FOREIGN PATENT DOCUMENTS

| | | |
|---|---|---|
| CN | 106778676 | 5/2017 |
| CN | 106952200 | 7/2017 |
| CN | 107154202 | 9/2017 |
| EP | 3759650 A1 | 1/2021 |
| WO | 2020/046346 A1 | 3/2020 |

OTHER PUBLICATIONS

Negron, T.P., et al., "Classroom Attentiveness Classification Tool (ClassACT): The system introduction," IEEE International Conference on Pervasive Computing and Communications Work in Progress, 2017, 4 pages.

Abhay Gupta et al: "DAiSEE: Towards User Engagement Recognition in the Wild", arxiv.org, Cornell University Library, 281 Olin Library Cornell University Ithaca, NY 14853, Sep. 7, 2816 (2816-89-87), X P881358276, * Sections 2, 3, 3.1, 3.3 * * Sections 4, 4.2, 4.4 * * Section 5 * * Section 7 * * figures 7, 12 * * table 1.

Egron Timothy P et al: "Classroom Attentiveness Classification Tool (ClassACT): The system introduction", 2017 IEEE International Conference on Pervasive Computing and Commun. https://www.semanticscholar.org/paper/Classroom-Attentiveness-Classification-Tool-The-Negron-Graves/0ea42ecf50a70bffb1a3dfcd27db9cd403dd5dac#paper-header.

Lulu Chang "Artificial Intelligence Will Track Whether You're Paying Attention In Class" Nestor Software, Sep. 2017, LCA Learning.

* cited by examiner

COMPUTING DEVICE ATTENTION DETERMINATION

BACKGROUND

Computing devices are used in many scenarios in modern society. Businesses, home users, and other entities use computing devices such as desktop computers, laptops, and tablets to provide information to users of the computing devices. As a specific example, computing devices are used within an educational setting. In these examples, an instructor or administrator may prepare or acquire information to be presented to students on computing devices. For example, a multimedia presentation may be uploaded to a computing network. Students may then access the network to view the multimedia presentation on their own particular computing device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
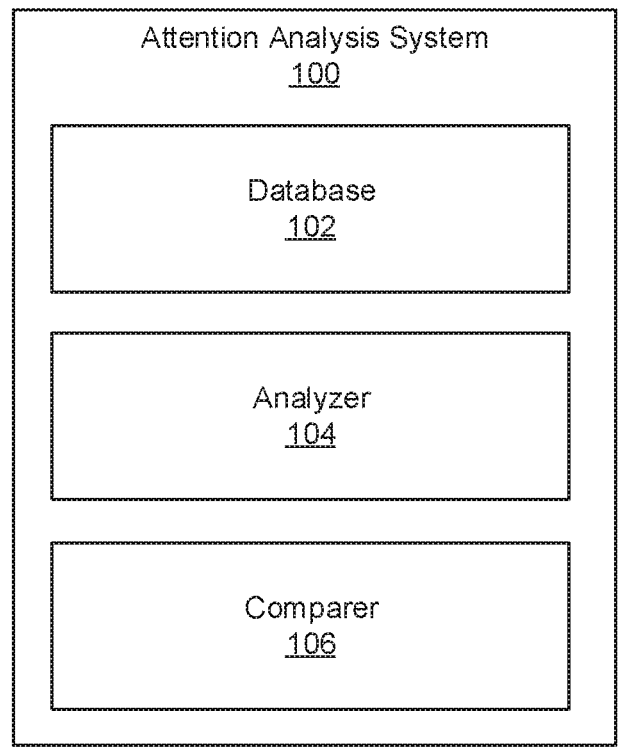
FIG. 1 is a block diagram of a system for computing device attention determination, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

While computing devices have clearly enhanced information dissemination in a variety of environments, some scenarios may reduce their positive effect. For example, in an educational setting, students may get distracted when in front of a computer screen. Moreover, a teacher in a room full of students in front of computer screens may have a difficult time keeping each student's focus on their respective computer screens. In attempt to maintain the focus of the students, the teacher may walk around a room and ensure each student is paying attention. However, doing so may be ineffective, especially in a large room full of multiple students and takes an instructors attentions away from other students while individually addressing a particular student. In other settings, distraction from information presented on a computing device is also an issue.

Accordingly, the present specification describes a method of addressing user distraction in front of a computing device screen. For example, as described above, one teacher in a classroom of many students may not be able to pay full attention to all the students and make sure that each student is actively engaged in the learning process. Accordingly, the present specification addresses this issue by using image processing to detect a facing direction of a student's head with a camera—sometimes disposed on the computing device—and sending a notification to an instructor management console when a student is not paying attention, i.e., has been facing away from the computing device screen for a certain period. In addition to eye gaze, other user position information may be relayed to the management console along with other non-user position information, such as a user's interaction with the computing device. When it is determined that a user is not paying attention to their computing device, a notice may be provided, either to an administrator such as the instructor or a user such as a student, notifying of the lack of focus.

Specifically, the present specification describes an attention analysis system. The attention analysis system includes a database. The database includes images indicative that users are paying attention to corresponding computing devices and images indicative that users are not paying attention to corresponding computing devices. The attention analysis system also includes an analyzer to extract multiple user position characteristics from a stream of images of a user disposed in front of a computing device. A comparer of the attention analysis system determines, by comparing the stream of images of the user to the images in the database, whether the user is paying attention to the computing device.

The present specification also describes a method. According to the method, a stream of images is collected from a computing device. The stream of images depict a user disposed in front of the computing device. Multiple user position characteristics are extracted from the stream of images. The stream of images is then compared to a database that includes 1) images indicative that users are paying attention to corresponding computing devices and 2) images indicative that users are not paying attention to corresponding computing devices. It is then determined, based on the comparison, whether the user is paying attention to the computing device.

The present specification also describes a tangible machine-readable storage medium encoded with instructions executable by a processor. The machine-readable storage medium includes instructions to collect from multiple computing devices, a corpus of images that include 1) images indicative that users are paying attention to corresponding computing devices and 2) images indicative that users are not paying attention to corresponding computing devices. The machine-readable storage medium also includes instructions to collect from a computing device, a stream of images of a user disposed in front of the computing device; extract multiple user position characteristics from the stream of images; and compare the stream of images to the corpus of images. The machine-readable storage medium also includes instructions to collect information regarding a user interaction with the computing device; instructions to, based on a comparison of the stream of images to the corpus of images and the information regarding the user interaction with the computing device, determine whether the user is paying attention to the computing device; and instructions to provide notice regarding whether the user is paying attention to the computing device.

In summary, using such an attention determining system 1) allows for a systematic and effective way to track focus to material being presented on a computing device; 2) allows remote presenters information regarding audience engagement; and 3) allows presenters to focus on preparation and presentation of material without worrying about audience distraction.

Turning now to the figures, FIG. 1 is a block diagram of a system (100) for computing device attention determination, according to an example of the principles described herein. Specifically, the attention analysis system (100) may be used to determine whether a user disposed in front of a computing device is actively paying attention, or focusing, on the material being presented on the associated computing device. The attention analysis system (100) may be presented in any number of environments. One particular example is an educational setting, where a teacher, who may be remote or physically within the same room as the audience, is presenting educational material to students. The presented material may be streamed to those computing devices from a computing device associated with the instructor. In another example, an administrator or instructor is monitoring the users as they are independently viewing material on the computing devices. While specific reference is made to an educational setting, the attention analysis system (100) may be used in other settings such as a business presentation setting. As the attention analysis system (100) is used to determine whether users are paying attention to their respective computing devices, the attention analysis system (100) may include a network connection to the multiple computing devices.

The attention analysis system (100) includes a database (102). This database (102) includes a corpus of images. The images may be categorized into at least two subsets of images. A first being images that are indicative of users paying attention to corresponding computing devices and a second being images that are indicative of users not paying attention to corresponding computing devices. Throughout the specification, the term "images" refers to still images or frames of a video. These images serve as a baseline for determining when a particular user is paying attention to their respective computing device. What types of images indicate a person showing attention are gathered in the model is a process called training. This training is often a manual exercise, wherein a user makes the assessment whether or not an image indicates that a person is paying attention or not. For every image that is trained, the user makes a judgement and assigns a positive or negative value. It is this value that can be used to create the neural net and predict future images.

The attention analysis system (100) also includes an analyzer (104) to extract multiple user position characteristics from a stream of images of a user disposed in front of a computing device. That is, the analyzer (104) extracts more than just an eye gaze from the stream of images, but also other user position characteristics as described above, which may include mouth position, mouth movement, nose movement, eyebrow/eyelid position, and/or movement as well as general head position/movement. The analyzer (104) may also extract data relating to these characteristic from a number of predefined images which, as described above, are analyzed to form a basis against which the stream of images of the particular user are analyzed.

In some examples, the attention analysis system (100) is a machine-learning system. Being a machine-learning system (100), the system (100) and particularly the analyzer (104) can learn over time, simply by analyzing a variety of images/videos that indicate user attention or lack of user attention. That is, there may be various characteristics that indicate a user is paying attention to a computing device. One specific example is eye gaze. That is, a computing device may include an integrated camera. The position of the user's eyes towards the computing device screen is indicia that a user is paying attention to the display screen. By comparison, when a user's eyes are diverted away from the computer screen, i.e., down looking at a mobile device or to the side looking out a window or at another student's desk/screen, this is indicative that the user is not paying attention.

Another example is pupil dilation and/or eyelid position. For example, if a user's eyelids are in a more closed position rather than fully open, this may indicate that a user is falling asleep and therefore not paying attention. Other information may be used as well. That is, while specific reference is made to eye information and eye position information, other information may be indicative of a user paying attention. Examples include user head position information and user body position information. For example, similar to the position of the eyes, the position of a user's head towards the computing device screen may be indicative of paying attention to what is presented on the computing device, while a head angled downward or to the side indicates that the user is looking at something other than the user's own computing device.

Accordingly, the database (102) may include a corpus of images that have tags associated with them that indicate whether the related image identifies a user paying attention or a user not paying attention to the respective computing device. The analyzer (104) can then analyze the information, i.e., eye position, head position, and/or body position, to determine criteria that can be used as a benchmark to determine when another image indicates a user is paying attention to a computing device screen or not. That is, as an image/video to be analyzed is received, it is compared to determine what and how many characteristics it shares with the images in the database (102). If the image/video to be analyzed shares more characteristics with images indicative of a user paying attention, it may be determined that the user in the image/video to be analyzed is paying attention to the computing device. By comparison, if the image/video to be analyzed shares more characteristics with images indicative of a user not paying attention, it may be determined that the user in the image/video is not paying attention to the computing device. Thus, the machine-learning database (102) analyzes multiple characteristics, not just one, of the corpus of images. That is, multiple characteristics, not just one, are used to determine whether a user is paying attention to a computing screen or not.

With multiple user position characteristics extracted for a stream of images for a particular user and user position characteristics extracted for a reference corpus of images, a comparer (106) determines, by comparing the stream of images with the images in the database, whether the user is paying attention to the computing device. That is, the comparer (106) can determine whether the stream of images includes user position characteristics more consistent with images indicative of paying attention or with images indicative of a lack of attention. Based on such a comparison, a determination is made regarding user attention, and a notification may be presented to a user. For example, a notice may be provided to a user of the computing device reminding them to return their attention to the computing device. A notice may also be provided to an administrator of the environment such that remedial action may be taken. For example, in the case of a classroom setting, an output of each student's level of attention may be provided to an instructor such that the instructor may take remedial action to bring the student's attention back to the computing devices.

Thus, in an education setting, an instructor may be provided with a management console that can gauge the state of the classroom based on its attention levels. On an individual level, the instructor is notified that a student may be having a tough time focusing. This can give the instructor an opportunity to ask the student if they need help, to find a new assignment to re-interest the student, or to help the instructor control a situation.

On a group level, if multiple students' attention are compromised, then the instructor can be notified that the classroom is becoming less focused. Responsive to such a determination, the instructor may change activities or move on to another subject. This information would be especially useful for remote instructors, who cannot be there in full capacity. Additionally, this same protocol can be used to indicate whether or not a student might be cheating on an assignment by looking over at another student's computer. Quick notifications to the instructor management console can alert the instructor quickly such that they may assess the situation.

In some examples, the stream of images/video of a user is collected from an integrated camera on a user's computing device. For example, a laptop computer or desktop may include a camera that can capture the images from which user position characteristics are extracted. In another example, a separate camera, such as one in the classroom may be used to determine student attention.

Accordingly, such an attention analysis system (100) provides a simply way to determine whether a single user, or multiple users, are focusing on a computing device screen. This may include analyzing more information than just eye gaze. That is other user position information such as head position, body position, and eye position may be relied on. Relying on more than just eye gaze provides a more accurate determination as to attention. That is, eye gaze alone is a single data point and may not accurately describe whether a user is paying attention or not. In a specific example, a user's eyes may be directed towards a computer screen. However, the user's eyelids may be partially closed indicating a user is not paying attention. Accordingly, the system (100) by relying on multiple user position characteristics provides a more accurate determination of user attention to a computing device screen.

Figure 2:
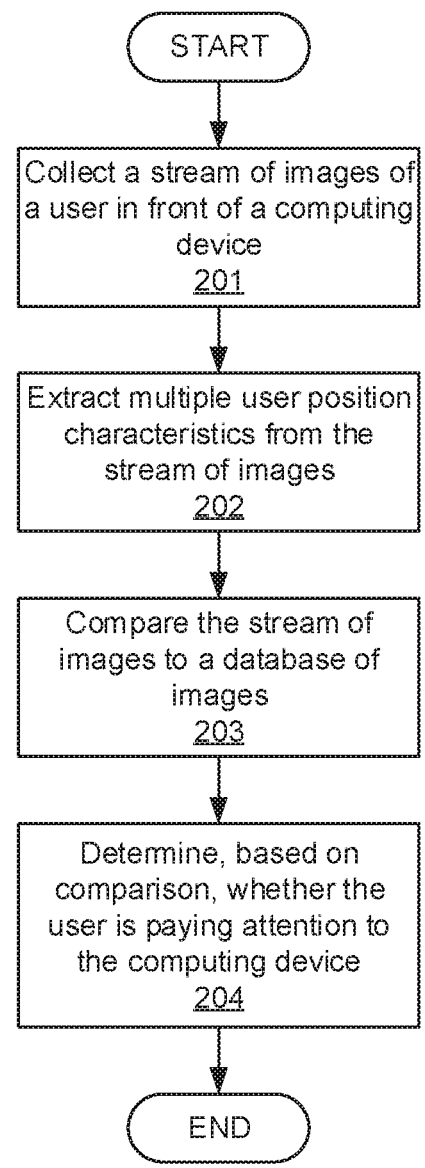
FIG. 2 is a flow chart of a method for computing device attention determination, according to an example of the principles described herein.

FIG. 2 is a flow chart of a method (200) for computing device attention determination, according to an example of the principles described herein. According to the method (200), a stream of images is collected (block 201) of a user in front of a computing device. As described above, the stream of images may be still images or may be images strung together as frames of a video clip. The images may be collected (block 201) from a camera integrated into the computing device of the user or may be collected from another source such as a camera(s) disposed in the room with the user. In either case, the camera captures images of the user as they are sitting in front of a respective computing device.

Multiple user position characteristics are extracted (block 202) from the stream of images. Such user position characteristics include eye gaze and additional characteristics. For example, user eye information may include additional information relating to a position/movement of a user's eye. As specific examples, user eye information may include a gaze direction, pupil dilation, eye movement, etc. Additional pieces of eye position information provide better results regarding user attention. That is, while an eye gaze towards a user computing device is indicia of user attention, pupil dilation may be also be indicative of user attention. As yet another example eye movement may be indicative of user attention. The combination of this information provides more information than eye gaze alone regarding user attention.

For example, it may be the case that a user is not looking at a computing device screen, but is looking down at a keyboard. Eye gaze alone may indicate that this user is not paying attention. However, knowing that the computing device includes a keyboard, eye movement information may indicate that a user's eyes are frequently going from a downward position (looking at the keyboard) to an upward position (looking at the screen). Thus, even though a user's gaze is not entirely at the computing device, they may still be paying attention, albeit with their gaze in a different direction, i.e., at the keyboard or looking at a text book.

The attention analysis system (FIG. 1, 100) may extract (block 202) additional characteristics, in addition to eye position information. For example, user head position information that indicates a head position/movement may also indicate user attention. Examples of such head position/movement may indicate that a user is not looking at the computing device screen. For example, a head position angled away from the computing device screen indicates a user is not paying attention. Head position information may also be used to expound upon information collected eye position information. For example, a user may rest their head on their hand at an angle while looking at the computing device screen. Eye gaze alone may therefore indicate a user is paying attention, as their eyes are in the direction of the computing screen. However, the resting of the head on the propped hand of a user is indicia that a user, despite looking at the screen, is not paying attention.

Other examples of head position information include head feature position information, such as a position/movement of eyelids, eyebrows, nose, and/or mouth. As a specific example droopy eyelids may indicate that again, while a user gaze may be towards a computing device screen, a user is in fact not paying attention. Thus, the present specification by relying on user position information beyond eye gaze provides more details and more data points such that a more accurate determination of whether a user is paying attention or not may be made.

In yet another example, the information may include user body position information. For example, shoulder angle information may be indicative of whether a user is slouching in their chair, which may be indicia that a user is not paying attention. While specific reference is made to particular body position characteristics of a user, other body position/movement characteristics may be extracted (block 202) from a stream of images for a user by which it may be determined whether that user is paying attention or not.

The stream of images, and more particularly the extracted characteristics from the stream of images, are compared (block 203) against a database (FIG. 1, 102) of images. The database (FIG. 1, 102) of images against which the stream of images are compared have been similarly analyzed with characteristics extracted therefrom. As described, the database (FIG. 1, 102) of images includes a training set which includes images and a classification as to whether it indicates a user is paying attention or not. The features of these images are analyzed such that user position characteristics may be mapped to either an attentive or non-attentive user.

Thus, the comparison (block 203) determines whether the stream of images shares more common characteristics with images reflecting high attention or with images reflecting poor attention. In some examples, the comparison (block 203) of the stream of images may be performed over a period of time. For example, it may not be the case that a user looking away from his/her computing device screen for a few seconds indicates they are not paying attention. However, the user looking away from his/her computing device for 10-15 seconds may be more indicative of a lack of attention. That is, distraction is gauged in combination with the length of time that a user's face is positioned away from the screen and the number of occurrences. Outliers and anomalies are considered momentary pauses and rests. Recurring infractions by comparison, provide a more sound indication of user distraction. Accordingly, when the image gathered in real-time execution triggers a negative state, that action is logged and tracked over time.

With such information extracted (block 202) and compared (block 203) over time, the attention analysis system (FIG. 1, 100) determines (block 204), based on the comparison, whether the user is paying attention to the computing device. Such a determination (block 204) may be made based on a degree of similarity between the stream of images and images of the different subsets in the database (FIG. 1, 102). That is, the attention analysis system (FIG. 1, 100) determines with which of the subset of images the stream of images has more in common. That is, whether the stream of images has more in common with the images indicative that a user is paying attention to a corresponding computing device or whether the stream of images has more in common with the images indicative that a user is not paying attention to a corresponding computing device. As used in the present specification and in the appended claims the term "in common" refers to a quantity of shared user position characteristics of the images. Note that such a determination is not based on a single factor, i.e., eye gaze, but whether the image on the whole shares more common characteristics (e.g., eyelid position, mouth movement, head angle, appendage position, body angle), with one or the other set of images.

Thus, the present specification describes a method (200) that relies on a reliable set of images, i.e. the training set which may include thousands or even millions of examples, from which characteristics indicative of attention or distraction are drawn. Comparing a set of images depicting a particular user against these images allows for a determination as to whether a user is paying attention to their computing device.

Figure 3:
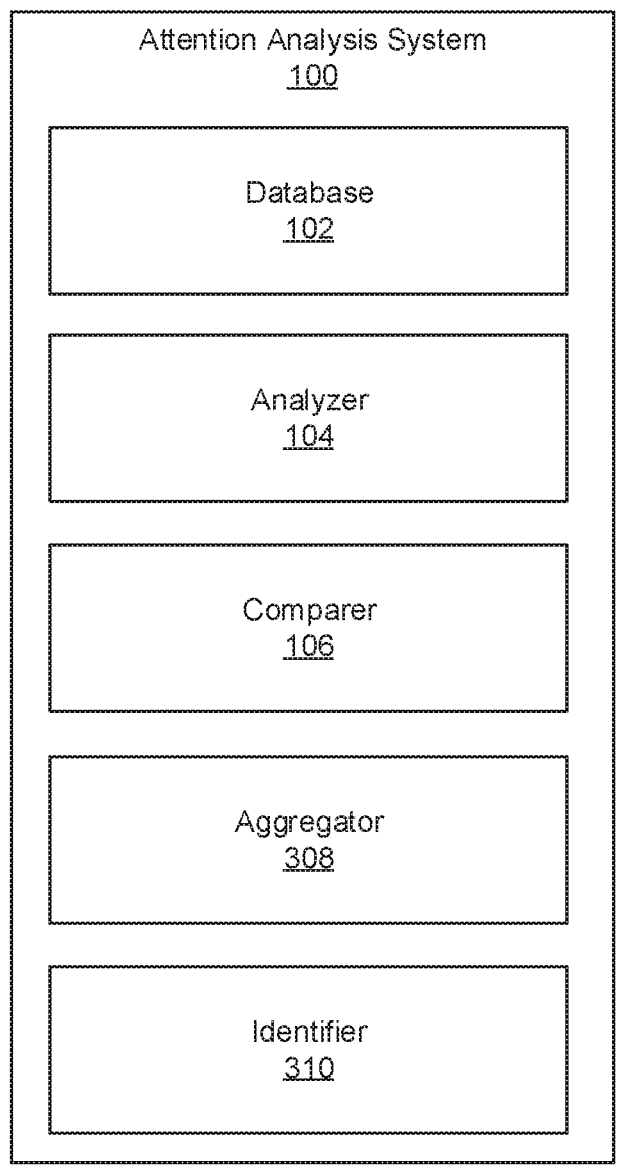
FIG. 3 is a block diagram of a system for computing device attention determination, according to another example of the principles described herein.

FIG. 3 is a block diagram of a system (100) for computing device attention determination, according to another example of the principles described herein. As described above in connection with FIG. 1, the attention analysis system (100) includes a database (102), an analyzer (104), and a comparer (106). In some examples, the attention analysis system (100) includes additional components.

For example, the attention analysis system (100) includes an aggregator (308) to generate an output resulting from the analysis of different sets of images, each set corresponding to a different user. That is, the aggregator (308) generates an output based on comparisons of multiple streams of images relating to multiple users with the images in the database (102). In so doing, an aggregate level of attention of multiple users can be indicated. That is, a different set of remedial actions may be carried out if multiple users are not paying attention as opposed to a single user not paying attention.

For example, in an educational setting if multiple users are not paying attention, it may be indicative that the current pedagogical technique is not effective, or that an instructor has spent too much time on a particular topic and that the students in the classroom could benefit from a change in subject. The information collected by the aggregator (308) may also be used to evaluate a presenter, teacher, or administrator. For example, if a majority of the audience is not paying attention to a particular presentation, as indicated by a comparison of the stream of images for those users against the database of images, it may indicate that the presenter, teacher, or administrator has not effectively presented the material. By comparison, if a majority of users are actively engaged in the presentation, it may indicate that the presenter, teacher, or administrator has been effective in delivery the content.

Still further, in an example, the attention analysis system (100) includes an identifier (310) to identify patterns in the aggregate level of attention. For example, it may be the case that a certain group of users are not paying attention, but that others are. The identifier (310) may identify such patterns. As a specific example, it may be the case that a particular region within the classroom has students that are not paying attention. This may be presented on the management console of the instructor as a heat map, thus suggesting that perhaps students in that area should be separated from one another.

In yet another example, the identifier (310) may indicate that users within a certain demographic, for example a certain age range, are more prone to falling out of attention as compared to another age range. Accordingly, this may be presented to the administrator to tailor the subject matter to be more wide-reaching in regards to audience demographics.

Accordingly, the additional components within the attention analysis system (100) provide additional information that can be used to improve user focus. In some examples, the information collected could be transmitted elsewhere. For example, as described above an aggregate level of attention may be passed such that an evaluation of the presenter or instructor may be made. In another example, the aggregate level of attention as well as the output of the identifier (310) may be passed to enhance and alter the subject matter, or form, of a presentation. For example, it may be the case that a video presentation shown in a dark room leads to many users falling asleep as indicated by a comparison of body position features of the various users compared against images in the database. Accordingly, the presentation of the material may be changed to an interactive multimedia presentation rather than a video display.

Figure 4:
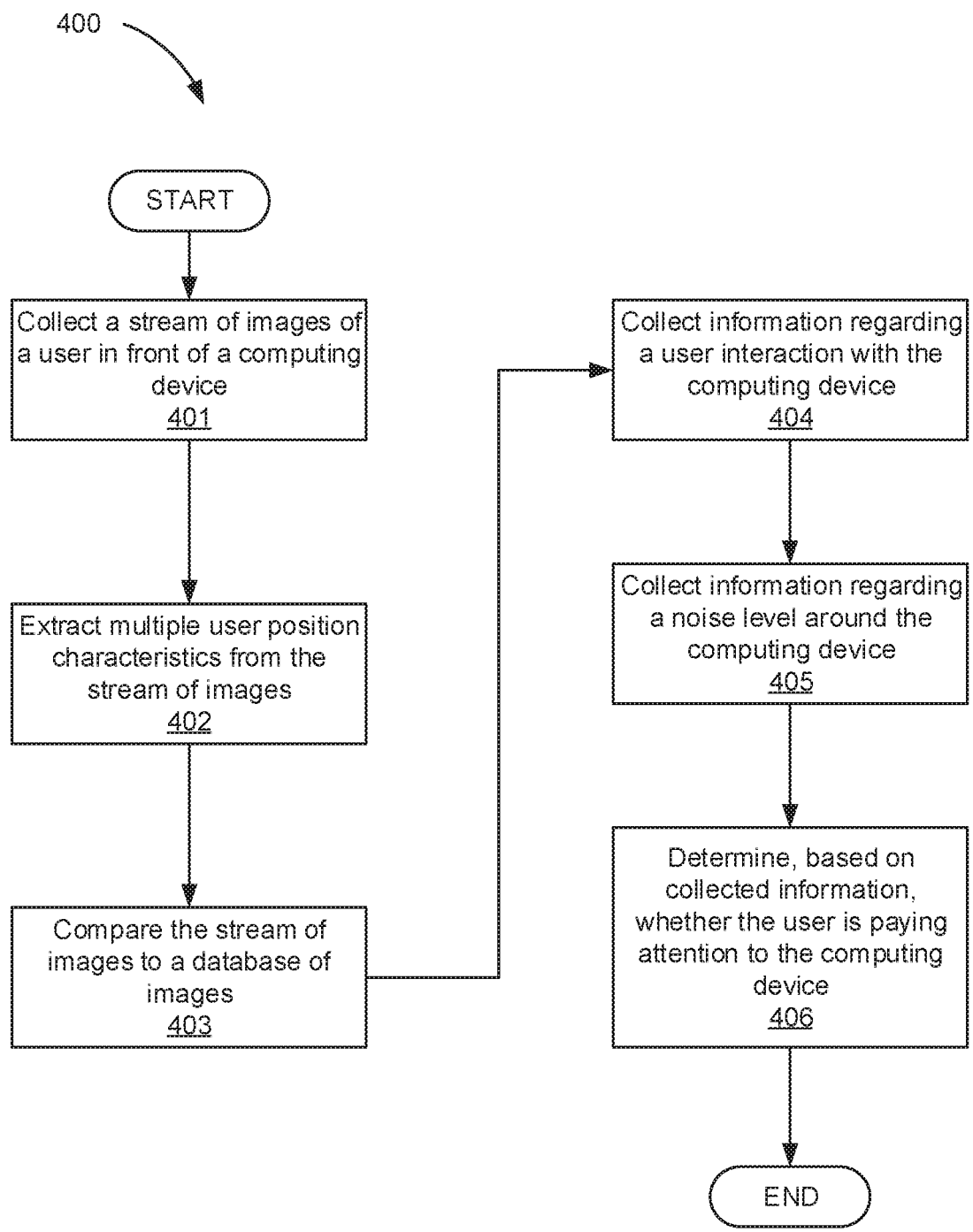
FIG. 4 is a flow chart of a method for computing device attention determination, according to another example of the principles described herein.

FIG. 4 is a flow chart of a method (400) for computing device attention determination, according to another example of the principles described herein. According to the method (400), a stream of images of a user in front of a computing device is collected (block 401) and user position characteristics are extracted (block 402) therefrom. This stream of images, and more particularly the extracted user position characteristics, are compared (block 403) against images in a training database. These operations may be carried out as described above in connection with FIG. 2.

In addition to user position information, the attention analysis system (FIG. 1, 100) may rely on other information as well. That is, while user position information may provide indicia of user attention, additional information may provide a more accurate determination. For example, a user may be looking at a computing device, while the user's mind may be elsewhere. Thus, eye gaze information alone may indicate a user is paying attention, however additional criteria may indicate that the user is not paying attention to the computer screen that they are looking at.

Accordingly, the attention analysis system (FIG. 1, 100) may rely on other pieces of information, specifically user interaction with the computing device. For example, user interaction with the computing device may include a user manipulation of a user input device. For example, a user may move a mouse cursor during an interactive display, or may enter information via a keyboard. This interaction may indicate attention to the presentation, regardless of an eye gaze direction. While particular reference is made to a few specific user input devices, multiple other types of user input devices may exist and a user's interaction with those devices may be collected (block 404).

In another example, user interaction may be indicated by a change of information displayed on the computing device. For example, a multimedia presentation may be displayed on the computing device. In this example, the attention analysis system (FIG. 1, 100) may detect a change in display content for example as a user advances through slides of the presentation. Such a change in displayed content can be considered in addition to the comparison (block 403) of images with the database to determine whether or not the user is actively paying attention to the computing device.

In another example, noise level information around the computing device may be collected (block 405). That is, ambient noise in a space can be a source of distraction to individuals. Accordingly, a microphone on a computing device or in a room may be used to determine a level of ambient noise around the user. This information, in addition to user position characteristics and user interaction information can provide a more accurate view of user focus.

Accordingly, in determining (block 406) whether a user is paying attention, all pieces of information may be considered. That is, the results of the comparison (block 403), the collected (block 404) information regarding user interaction with the computing device, and the collected (block 405) information regarding noise levels around the computing device all may be used in conjunction with one another by the attention analysis system (FIG. 1, 100) to determine user attention. As such, the present method (400) provides an environment where multiple pieces of different types of information, not just related to the user movement/position information, are used in determining user attention. Thus, the attention analysis system (FIG. 1, 100) and the computing device in which it is installed can provide a more accurate picture regarding user attention such that more targeted remedial measures, if needed, may be executed.

Figure 5:
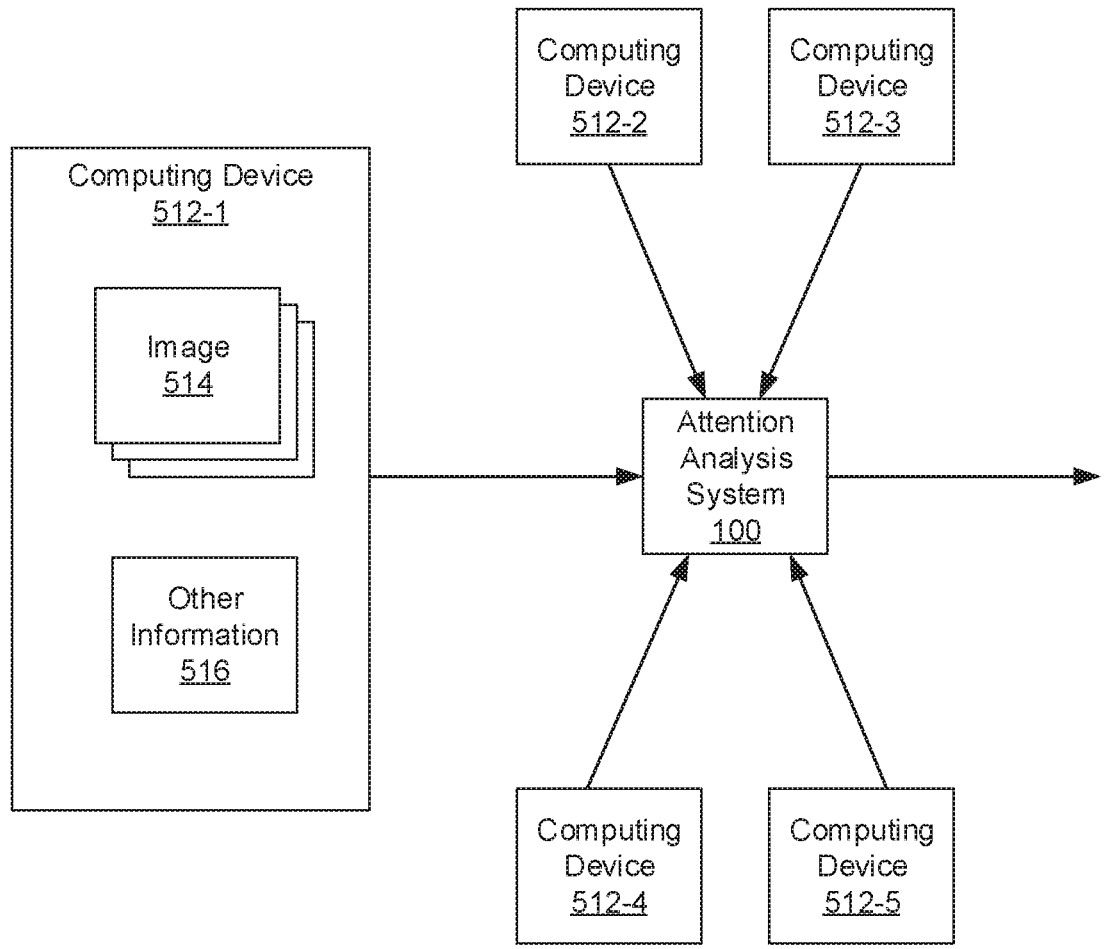
FIG. 5 is a diagram of an environment for computing device attention determination, according to an example of the principles described herein.

FIG. 5 is a diagram of an environment for computing device (512) attention determination, according to an example of the principles described herein. As described above, the attention analysis system (100) is coupled to a network of computing devices (512). One of those computing devices (512-1) is associated with a user of whom it is desired to know if he/she is paying attention to the computing device (512-1). The other computing devices (512-2, 512-3, 512-4, 512-5) provide the training set of images that are included in the database (FIG. 1, 102) to which the stream of images from the computing device (512-1) are compared.

As described above, this information is collected and analyzed by the attention analysis system (100) to determine a first set of characteristics that map to images of users paying attention to their computing device screens and a second set of characteristics that map to images of users not paying attention to their computing device screens.

The attention analysis system (100) also collects streams of images (514) from the first computing device (512-1). As described above, the images (514) may be still images taken over a period of time. In another example, the images (514) may be frames of a video clip also taken over a period of time.

The computing device (512) also transmits other information (516) such as information indicating a user interaction with the computing device (512-1) and noise levels around the computing device (512-1). All this information is processed by the attention analysis system (100) to determine whether a user is paying attention. Such an analysis may be performed for any number of computing devices (512). That is, such an analysis may be done for a single computing device (512) to ascertain the attention level of one user or such analysis may be done for multiple computing devices (512) to ascertain the attention level of multiple users. The information is then output by the attention analysis system (100). That is, the information may be output via a management console wherein a user of the management console can address individual distraction or aggregate distraction. Moreover, in some examples the information is transmitted further, for example to a server, where it is subsequently used for further analysis such as content development and/or instructor evaluation.

Figure 6:
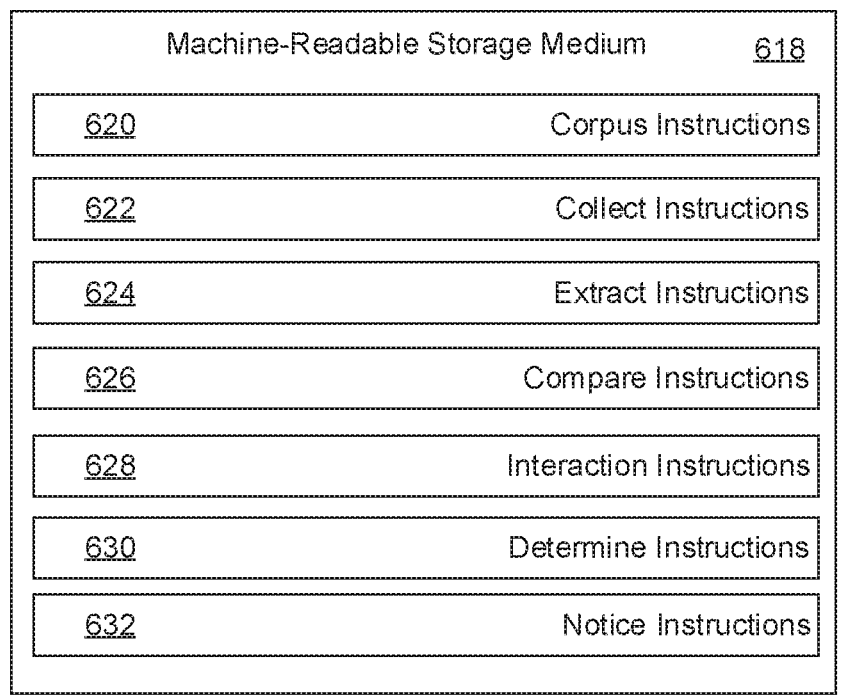
FIG. 6 is a diagram of a machine-readable storage medium for computing device attention determination, according to an example of the principles described herein.

FIG. 6 is a diagram of a machine-readable storage medium (618) for computing device attention determination, according to an example of the principles described herein. To achieve its desired functionality, a computing system includes various hardware components. Specifically, the computing system includes a processor. Machine-readable storage medium (618) is communicatively coupled to the processor. The machine-readable storage medium (618) includes a number of instruction sets (620, 622, 624, 626, 628, 630, 632) for performing a designated function. The machine-readable storage medium (618) causes the processor to execute the designated function of the instruction sets (620, 622, 624, 626, 628, 630, 632).

Although the following descriptions refer to a single machine-readable storage medium (618), the descriptions may also apply to multiple machine-readable storage mediums. In such examples, the instruction sets (620, 622, 624, 626, 628, 630, 632) may be distributed (e.g., stored) across multiple machine-readable storage mediums.

The machine-readable storage medium (618) represents any tangible and non-transitory memory capable of storing data such as programmed instructions or data structures used by the computing system.

Referring to FIG. 6, corpus instructions (620), when executed by a processor, may cause the computing system to, collect from multiple computing devices (FIG. 5, 512) a corpus of images that include images indicative that users are paying attention to corresponding computing devices and images indicative that users are not paying attention to corresponding computing devices. Collect instructions (622), when executed by a processor, may cause the computing system to collect from a computing device (FIG. 5, 512-1), a stream of images (FIG. 5, 514) of a user disposed in front of the computing device. Extract instructions (624), when executed by a processor, may cause the computing system to extract multiple user position characteristics from the stream of images (FIG. 5, 514). Compare instructions (626), when executed by a processor, may cause the computing system to compare the stream of images (FIG. 5, 514) to the corpus of images. Interaction instructions (628), when executed by a processor, may cause the computing system to collect information regarding a user interaction with the computing device (FIG. 5, 512-1). Determine instructions (630), when executed by a processor, may cause the computing system to, based on a comparison of the stream of images (FIG. 5, 514) to the corpus of images and the information regarding the user interaction with the computing device (FIG. 5, 512-1), determine whether the user is paying attention to the computing device (FIG. 5, 512-1). Notice instructions (632), when executed by a processor, may cause the computing system to provide notice regarding whether the user is paying attention to the computing device (FIG. 5, 512-1).

In summary, using such an attention determining system 1) allows for a systematic and effective way to track focus to material being presented on a computing device; 2) allows remote presenters information regarding audience engagement; and 3) allows presenters to focus on preparation and presentation of material without worrying about audience distraction.

What is claimed is:

1. An attention determining system, comprising:
   a database comprising:
      images indicative that users are paying attention to corresponding computing devices; and
      images indicative that users are not paying attention to corresponding computing devices;
   a processor to:
      collect, via a camera of a computing device, a stream of images of a user disposed in front of the computing device;
      collect, via a microphone of the computing device, information about an ambient noise level surrounding the user disposed in front of the computing device;
      extract, from the stream of images of the user, multiple user position characteristics;
      collect information regarding a user interaction with the computing device, the user interaction comprising a manipulation of a user input device by the user;
      determine, by comparing the stream of images of the user to the images in the database, and based on the ambient noise level and a period of time that is associated with the user interaction with the computing device, that the user is not paying attention to the computing device; and
      provide, in response to determining that the user is not paying attention to the computing device, a notice to the user via the computing device to remind the user to pay attention to the computing device.

2. The system of claim 1, wherein the processor is to generate an output, based on comparisons of multiple streams of images relating to multiple users disposed in front of multiple computing devices with the images in the database, indicative of an aggregate level of attention of the multiple users.

3. The system of claim 2, wherein the processor is to identify patterns in the aggregate level of attention and modify content that is presented to the multiple users via the multiple computing devices based on the patterns.

4. The system of claim 1, wherein the user is a student in a classroom and the processor is to provide a second notice to an instructor in the classroom indicating that the user is not paying attention to the computing device.

5. A method, comprising
   collecting, via a camera of a computing device, a stream of images of a user disposed in front of the computing device;
   extracting multiple user position characteristics from the stream of images;
   comparing the stream of images to a database comprising:
      images indicative that users are paying attention to corresponding computing devices; and
      images indicative that users are not paying attention to corresponding computing devices;
   collecting, via a microphone of the computing device, information about an ambient noise level surrounding the user disposed in front of the computing device;
   collecting information regarding a user interaction with the computing device, the user interaction comprising a manipulation of a user input device by the user;
   determining, based on the comparison, based on a period of time associated with the user interaction, and based on the ambient noise level, that the user is not paying attention to the computing device; and
   providing, in response to determining that the user is not paying attention to the computing device, a notice to the user via the computing device to remind the user to pay attention to the computing device.

6. The method of claim 5, wherein the user position characteristics comprise at least one of user eye position information, user head position information, or user body position information.

7. The method of claim 5, wherein the user interaction with the computing device causes a change in content displayed on a display of, the computing device.

8. The method of claim 5, wherein comparing the stream of images to the database comprises comparing the stream of images to the database over a period of time.

9. The method of claim 5, comprising collecting, via a second microphone disposed in a space surrounding the user, additional information about the ambient noise level surrounding the user disposed in front of around the computing device.

10. The method of claim 5, wherein determining, based on the comparison, that the user is not paying attention to the computing device comprises determining that the multiple position characteristics correspond more closely to the images indicative that users are not paying attention to corresponding computing devices than to the images indicative that users are paying attention to corresponding computing devices.

11. A non-transitory machine-readable storage medium having instructions stored thereon that, when executed by a processor, cause the processor to:
   collect a corpus of images comprising:
      images indicative that users are paying attention to corresponding computing devices; and
      images indicative that users are not paying attention to corresponding computing devices;
   collect, via a camera of a computing device, a stream of images of a user disposed in front of the computing device;
   extract, from the stream of images, multiple user position characteristics;
   compare the stream of images to the corpus of images;
   collect information regarding a user interaction with the computing device, the user interaction comprising a manipulation of a user input device by the user;
   collect, via a microphone of the computing device, information about an ambient noise level surrounding the user disposed in front of the computing device;

determine, based on the comparison of the stream of images to the corpus of images, the ambient noise level, and a period of time associated with the user interaction with the computing device, that the user is not paying attention to the computing device; and provide, to the user via the computing device, a notice to remind the user to pay attention to the computing device in response to determining that the user is not paying attention to the computing device.

12. The method of claim 7, wherein the user interaction with the computing device comprises movement of a cursor.

13. The machine-readable storage medium of claim 11, wherein the user interaction with the computing device comprises a change in content displayed on a display of the computing device.

14. The machine-readable storage medium of claim 11, the operations comprising providing a second notice indicating that the user is not paying attention to the computing device to a server.

15. The machine-readable storage medium of claim 11, wherein the user is a student in a class, the operations comprising providing a second notice to an instructor of the class indicating that the student is not paying attention to the computing device.

16. The system of claim 1, wherein the user interaction causes a change in content displayed on a display of the computing device.

17. The system of claim 16, wherein the user interaction comprises movement of a cursor.

18. The method of claim 5, wherein the user is a student in a class and the method comprises providing a second notice to an instructor of the class indicating that the student is not paying attention to the computing device.

19. The method of claim 7, wherein the user input device comprises a keyboard, and wherein the user interaction with the computing device comprises entry of information via the keyboard.

20. The method of claim 5, wherein the user is a first student associated with a class, the method comprising:
    collecting, via a camera of a second computing device, a second stream of images of a second student associated with the class that is disposed in front of the second computing device;
    comparing the second stream of images to the database;
    collecting, via a microphone of the second computing device, information about a second ambient noise level surrounding the second student;
    determining, based on the comparison of the second stream of images to the database and the second ambient noise level, that the second student is paying attention to the second computing device; and
    providing a second notice to an instructor associated with the class, the second notice indicating that the first student is not paying attention to the computing device and that the second student is paying attention to the second computing device.

* * * * *